(No Model.) 3 Sheets—Sheet 2.

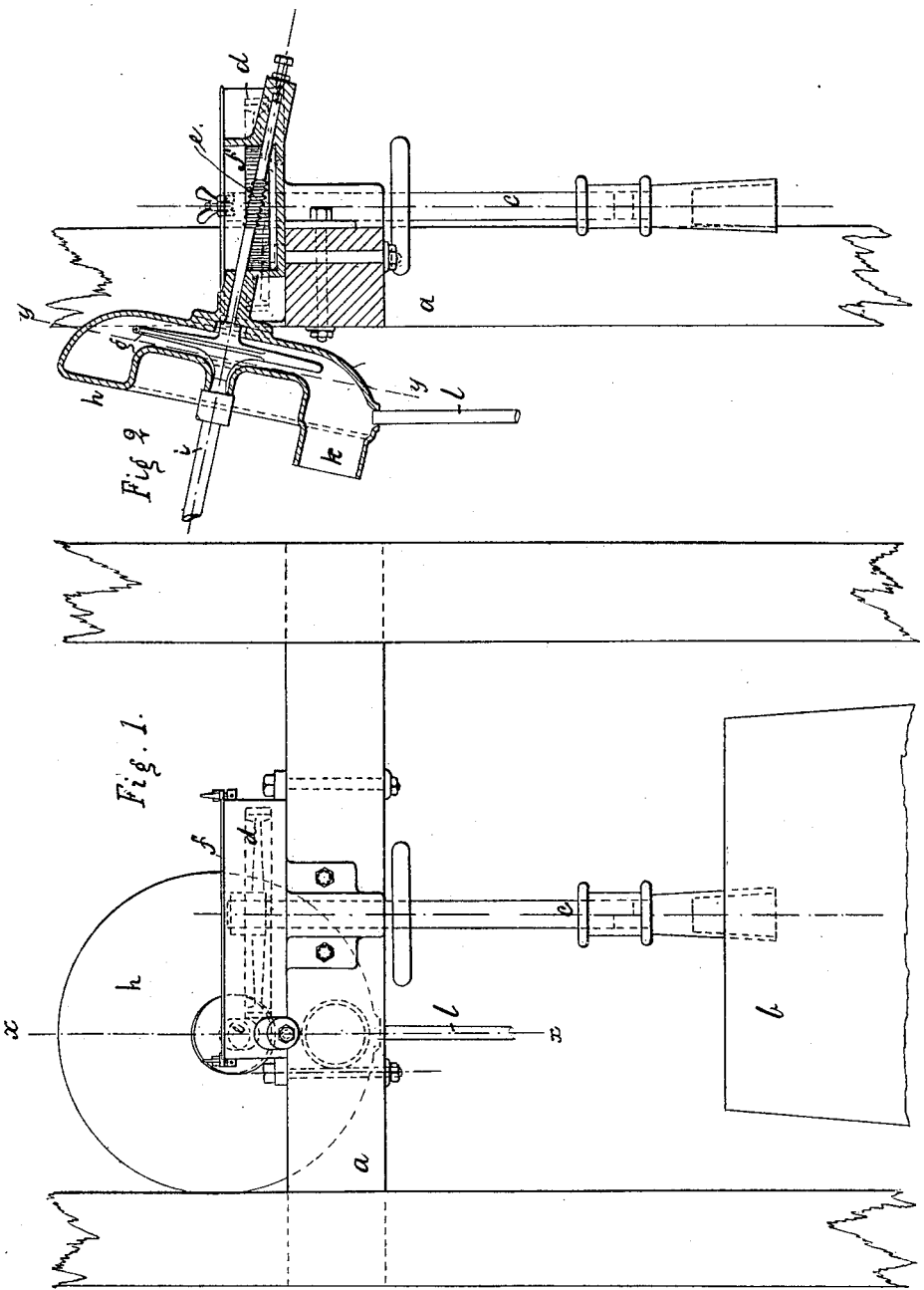

G. DE LAVAL.
MOTOR FOR CHURNS.

No. 368,327. Patented Aug. 16, 1887.

Witnesses
Chas H Smith
W. L. Serrell

Inventor
Gustaf de Laval.
per Lemuel W. Serrell
atty

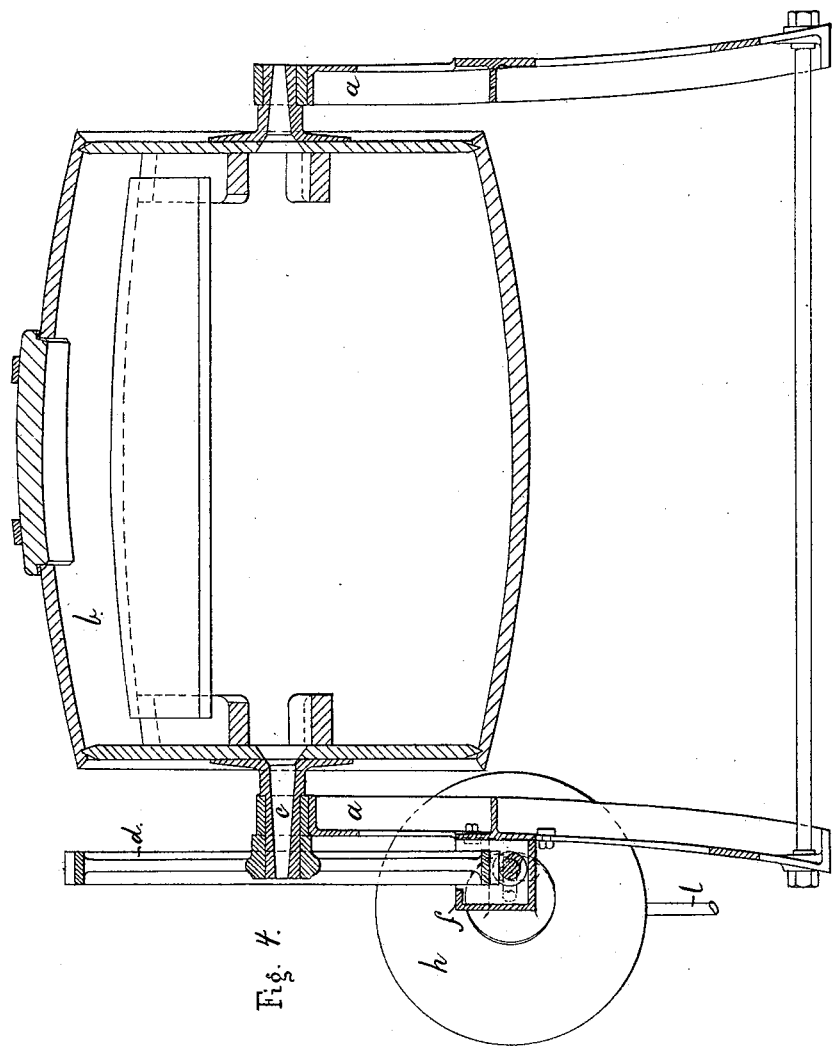

UNITED STATES PATENT OFFICE.

GUSTAF DE LAVAL, OF STOCKHOLM, SWEDEN.

MOTOR FOR CHURNS.

SPECIFICATION forming part of Letters Patent No. 368,327, dated August 16, 1887.

Application filed December 28, 1886. Serial No. 222,757. (No model.)

*To all whom it may concern:*

Be it known that I, GUSTAF DE LAVAL, a subject of the King of Sweden, and a resident of Stockholm, Sweden, have invented certain new and useful Improvements in Motors for Churns, of which the following is a specification.

This invention relates to a device for driving churns by steam, in which the churn is mounted upon a shaft that is provided with a toothed wheel which gears with a worm upon the shaft of a steam reaction-wheel. The proportion between the worm and the toothed wheel is such that the churn receives the required speed of rotation.

Figure 3:
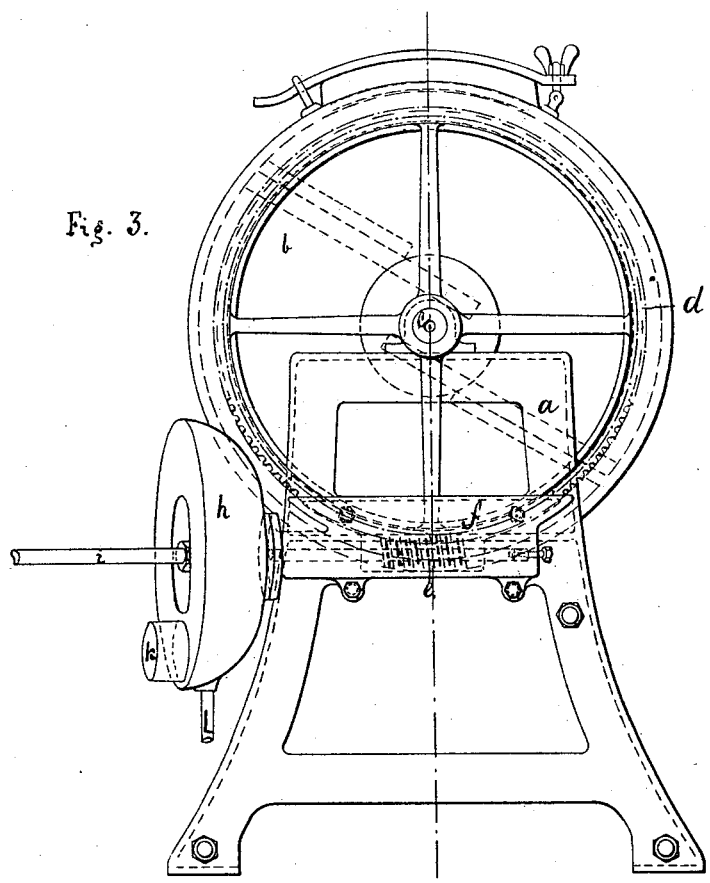
Figure 5:
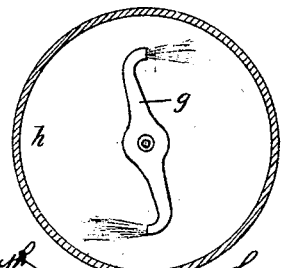

In the annexed drawings, Figure 1 represents the upper part of a vertically-mounted churn and the steam reaction-wheel for operating it. Fig. 2 is a section of the reaction-wheel at the line $x\,x$, Fig. 1. Fig. 3 represents a horizontal churn and driving mechanism. Fig. 4 is a longitudinal section of the same; and Fig. 5 is a section at the line $y\,y$, Fig. 2, and elevation of the steam-wheel.

$a$ is the stand or supporting-frame; $b$, the churn; $c$, the shaft of the churn, which is mounted in bearings upon the frame $a$; $d$, a toothed wheel upon the shaft $c$; $e$, a worm mounted in suitable bearings upon the frame and gearing with the wheel $d$; $f$, a casing surrounding this worm and containing its bearings; $g$, a steam reaction-wheel having curved arms; $h$, a casing in which the steam reaction-wheel or similar device is revolved; $i$, the inlet-pipe for the steam passing to the arms of the reaction-wheel; $k$, the outlet for the exhaust-steam; $l$, a pipe for letting out the water of condensation from the bottom of the casing $h$.

When using the apparatus, a cock in the steam-pipe is opened as much as necessary and the steam rushes into the reaction-wheel and through its arms and out against the air, causing it to revolve, and in turn the screw connected upon its shaft is given a rapid rotatory motion, and the worm drives the toothed wheel $d$ and causes the churn to revolve. The churn $b$ may be placed in a horizontal position, as in Figs. 3 and 4, or it may occupy a vertical position, as in Fig. 1, the same devices constituting the motor being available to operate the churn in either position.

I claim as my invention—

1. A motor for churns, consisting of the toothed wheel $d$, worm $e$, and their respective shafts, the steam reaction-wheel $g$ upon the shaft of the worm, a pipe, $i$, for supplying steam, and a case, $h$, surrounding the wheel, substantially as set forth.

2. A motor for churns, consisting of a toothed wheel, a screw-pinion meshing therewith, and their respective shafts, a steam-wheel upon the shaft of the worm, and a pipe for supplying steam to the steam-wheel, substantially as set forth.

In testimony whereof I have signed my name to this specification in the presence of two subscribing witnesses.

GUSTAF DE LAVAL.

Witnesses:
 LOUIS RICHARD,
 J. A. BOMGREN,
  *Both of Stockholm.*